March 30, 1965  T. J. CAPPELLO  3,176,209
SPEED CONTROL CIRCUIT FOR D.C. MOTOR
Filed Jan. 4, 1963
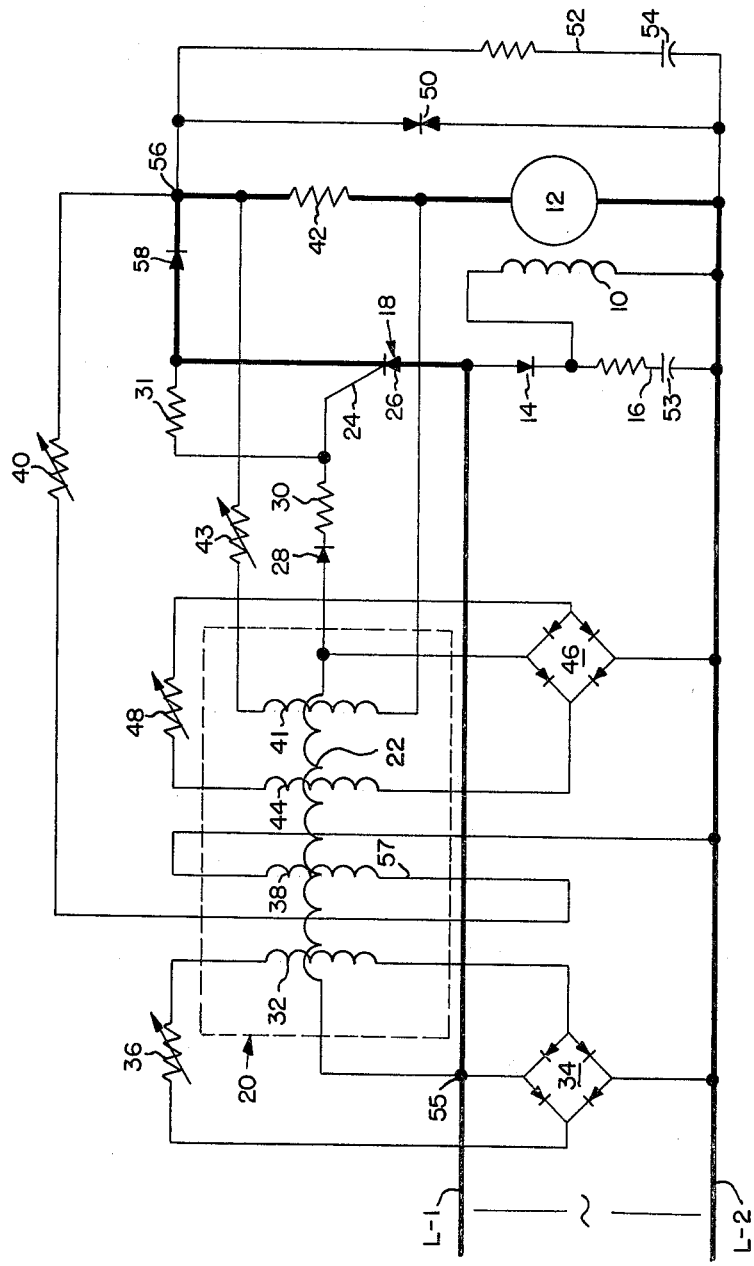
INVENTOR.
TRIEST J. CAPPELLO
BY
ATTORNEY

United States Patent Office 3,176,209
Patented Mar. 30, 1965

3,176,209
SPEED CONTROL CIRCUIT FOR D.C. MOTOR
Triest J. Cappello, Depew, N.Y., assignor, by mesne assignments, to Liberty National Bank and Trust Company, Buffalo, N.Y.
Filed Jan. 4, 1963, Ser. No. 249,408
3 Claims. (Cl. 318—332)

This invention relates to a novel electrical circuit for controlling the speed, or energization level of a D.C. motor, or the energization level of any desired D.C. electrical load device.

One important object of the invention is to provide a relatively simple and inexpensive electrical circuit for controlling the energization level of a D.C. load device such as a D.C. motor.

Another object is to provide a circuit of this type including feedback means enabling the circuit to achieve relatively uniform control of a selected operating characteristic of the load, thereby, for example, to maintain the speed of a motor relatively constant despite variations in the load on it.

Another object is to provide a device of this type including a triggerable half wave rectifier, a saturable reactor for triggering the rectifier, and means for positively reversing the magnetic flux in the reactor during the intervals between the conductive periods of the rectifier, thereby to maximize the effective range of the reactor.

Silicon controlled rectifier drives have been developed in recent years, and are usable in connection with the operation, for instance, of a D.C. motor from an A.C. current. In such rectifier drives various methods have been used for triggering the silicon controlled rectifiers. One object of this invention is to provide new and simplified means for controlling the firing time of silicon controlled rectifiers, particularly when used in connection with the operation of a D.C. motor.

The foregoing and other objects and advantages of the invention will become apparent from the following detailed description of a representative embodiment thereof, taken in conjunction with the drawing, the single figure of which is a schematic circuit diagram of a presently preferred embodiment of the invention. In the figure, the main power handling portion of the circuit is shown in heavy lines, and the auxiliary and control portions in light lines.

The circuit of the invention makes use of a triggerable rectifier device such as a silicon controlled rectifier in series with the load, and a saturable reactor having plural control windings for triggering the rectifier device. The provision of plural control windings enables the circuit to compensate for both voltage and current variations in the load.

One feature of the invention relates to the connection of one of the control windings of the saturable reactor in series with the main winding to effect a positive reversal of the magnetic flux in the reactor core during the intervals between the conductive periods of the rectifier, thereby maximizing the effective reactance of the main winding and permitting the use of a relatively small reactor.

The circuit shown in the drawing is arranged for controlling the speed of a D.C. motor having a shunt field winding 10 and an armature 12. The field 10 is connected across the main power input leads L-1 and L-2 in series with a rectifier 14. A conventional RC filter 16 is connected across the field 10 to provide for smooth and quiet operation. The armature 12 is connected across the leads L-1 and L-2 in series with the silicon controlled rectifier 18, or other triggerable unidirectional current device. Firing of the silicon controlled rectifier 18 is controlled by the magnetic amplifier 20 which is a saturable reactor, the main or gate winding 22 of which is connected to the control electrode 24 and the anode 26 of the silicon controlled rectifier through a diode rectifier 28 and a current limiting resistor 30. The anode 26 of the silicon controlled rectifier is connected to one lead L-1 of the main power line. A resistor 31 is connected between the trigger electrode 24 and the cathode of the silicon controlled rectifier 18 for controlling the voltage across the rectifier gate. This resistor allows a small magnetizing current to flow through the reactor so that it begins to saturate before rectifier 18 conducts.

The first control winding 32 of the saturable reactor is connected across the input leads L-1 and L-2 through a full wave rectifier device 34 and in series with a variable resistor 36. This winding 32 is oriented to produce flux in the reactor core in the same direction as the flux produced by the main winding 22 during the positive half cycle of the supply voltage. The term "positive half cycle," as used herein is intended to mean the half cycle during which the first power lead L-1 is positive relative to the second lead L-2. The first control winding 32 is the variable speed control winding and causes the magnetic amplifier or reactor 20 to fire at a point during each positive half cycle of the supply voltage depending in part on the setting of the variable resistor 36.

The second control winding 38 is connected across the motor armature 12 in series with a variable resistor 40, and is oriented so that flux produced by current flowing through it opposes flux produced by the current flowing through the first control winding 32, thereby tending to delay firing of the magnetic amplifier 20. This is a negative feedback arrangement, which tends to maintain a relatively constant voltage across the armature 12. If, for example, the voltage across the armature 12 decreases due to an increase in load on the motor, or for any other reason, the current through the second control winding 38 will decrease, and there will be less flux opposing the flux produced by the first winding 32. The main reactor coil 22 will then fire earlier in the cycle in response to the flux produced by the first winding 32.

The third control winding 44 is connected through a full wave rectifier 46 in series with the main winding 22 across the main power leads L-1 and L-2. The third control winding 44 is oriented to induce flux in the opposite direction to the flux induced in the main winding 22 under control of first winding 32, thereby to insure full flux reversal in the reactor core during the negative half cycle and maximum reactance in the main winding 22 at the start of each positive half cycle. A limiting resistor 48, or other current limiting device, is preferably connected in series with the third control winding 44 to prevent excessive firing during the negative half cycle and excessive cancellation of the flux produced by the variable speed control winding 32.

A fourth control winding 41 may be connected, as shown, across a relatively small value resistor 42, which is in series with the motor armature 12. A variable resistor 43 connected in series between the fourth winding 44 and the low value resistor 42 permits adjustment of the current flow produced in the fourth winding 41 in response to the voltage across the low value resistor 42. The fourth winding 41, is oriented for positive feedback, and because of its connection across the resistor 42, is current sensitive and tends to increase armature voltage thus compensating for a drop in speed caused by the voltage drop across the armature 12. Depending upon the motor characteristics and the type of control desired, either one or both of the second and fourth control windings 38 may be used. Both are shown herein for illustrative purposes.

Control winding 38 may be connected to a conventional load compensator wired in series with armature 12 if load compensation is desired instead of negative feedback. With a magnetic amplifier having four windings, as illustrated, both load compensation and negative feedback are available.

A dual diode 50 or surge suppressor and a conventional RC filter 52 may also be connected as shown across the armature 12 for conventional transient surge protection and filtering action if desired. The capacitors 53 and 54 provide for filtering and increase the output voltage to the field and to the motor armature, respectively. A diode 58 provides additional protection against back flow of current. This diode is only a safety device and can be omitted, if desired.

The circuit of the invention is capable of providing excellent regulation of the energization level of the load, and is readily adjustable to compensate for the operating characteristics of the load. By appropriate adjustment of the feedback resistors 40 and 42, the circuit may be made to maintain either a relatively constant voltage across the load or current through it, or a combination of both, as desired in view of the type of control required. In addition, the circuit may be constructed solely of relatively inexpensive, commercially available components.

The operation of the circuit will be understood from the preceding description, but may be summed up here.

When A.C. power is applied to lines L–1 and L–2, voltage is impressed through terminal 55, and the gate winding 22 of the magnetic amplifier or saturable reactor 20, to the anode of the silicon controlled rectifier 18, and through the terminal 55 to the rectifier bridge 34. The core of the gate winding will begin to saturate; and a small, discrete pulse will appear at diode 28. The amplitude and shape of this pulse will depend upon the degree of saturation of the magnetic core, the degree of saturation being controlled by the ampere turns in windings 32, 44, and 38, and, if used, 41. As stated, control winding 32 operates to turn the magnetic amplifier 20 on; and control windings 44, 38, operate to turn the magnetic amplifier off. To enable the magnetic amplifier to be cut off completely, the rectifier bridge 46, which is connected between the gate winding 22 and line L–2, allows the core to be desaturated during the negative half cycle of the supply frequency. The controlled magnetic amplifier pulses are applied to the gate of the silicon controlled rectifier; and this rectifier conducts from the moment of triggering to the end of the positive half cycle. Half wave D.C. voltage is applied to the shunt field 10 through diode 14. Good regulation is achieved by feeding back the voltage from connection 56 through control winding 38 with plus to terminal 57 so that output voltage changes are reflected as follows:

(a) When the voltage at 56 increases because of a load decrease, the current through winding 38 will increase tending to turn the magnetic amplifier 20 off. As a result the tendency for the motor to run faster will be nullified by a drop in the output voltage of the silicon controlled rectifier 18.

(b) Conversely, if the load on the motor increases and it tends to slow down, less voltage will appear at 56. This results in less current flowing through winding 38.

With less ampere turns in winding 38, the output of magnetic amplifier 20 will increase so that rectifier 18 will fire earlier thus increasing the output voltage and speed to its original value.

The feature of being able to use ampere turn control, and the self-desaturating technique simultaneously, and during one complete cycle of the supply frequency, enables the circuit to utilize a conventional or standard magnetic amplifier.

The variable speed drive disclosed gives excellent regulation. It has the distinct advantage of using standard components which, when combined in a circuit such as described, will give excellent control at all speed ranges.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. An electrical control circuit for controllably energizing a load such as an electric motor or the like comprising:
   (a) a triggerable rectifying device,
   (b) means connecting said device in series with the load across an alternating current source,
   (c) a saturable reactor for triggering said device,
   (d) said reactor having a main winding and plural control windings,
   (e) and a uni-directional current device,
   (f) one of said control windings being connected across the current source in series with said main winding and said uni-directional current device,
   (g) the trigger terminal of said triggerable rectifying device being connected to the junction between said main winding and said one control winding.

2. An electrical control circuit for controllably energizing a load such as an electric motor or the like comprising:
   (a) a triggerable rectifying device,
   (b) means connecting said device in series with the load across an alternating current power source,
   (c) a saturable reactor for triggering said device,
   (d) said reactor having a main winding and plural control windings,
   (e) said main winding being connected between the trigger terminal and one of the main terminals of said device,
   (f) and a pair of uni-directional current devices,
   (g) a first one of said control windings being connected through one of said uni-directional current devices across the power source,
   (h) a second one of said control windings being connected in circuit with the load and aranged to produce flux in said reactor in opposition to the flux produced by said first control windings, thereby to provide a negative feedback signal from the load to said reactor,
   (i) and a third one of said control windings being connected in series with the other one of said uni-directional current devices and said main winding across the power source, said third control winding being arranged to produce flux in said reactor in opposition to the flux produced by said first control winding, thereby to ensure substantially complete flux reversal in said reactor during each cycle of the power supply.

3. An electrical control circuit for connection between an alternating current source and a direct current load for variably controlling the energization rate of the load comprising:
   (a) a triggerable half wave rectifier,
   (b) means for connecting said rectifier in series with the load across the source,
   (c) a saturable reactor for triggering said rectifier,
   (d) said reactor having plural control windings and a main winding,
   (e) said main winding being connected between the trigger terminal and one of the main terminals of said rectifier,
   (f) a pair of uni-directional current devices,
   (g) a first one of said control windings being connected through one of said uni-directional current devices across the current source and arranged to cause said reactor to fire during half cycles of predetermined polarity of the source, (h) a second one of said control windings being connected in series with the other one of said uni-directional current devices and said main winding across the source, (i) said second control winding being arranged to produce flux in said reactor in a direction opposite from the flux produced by said first control winding, thereby to effect a substantially complete flux reversal in said reactor during each cycle of the source.

References Cited by the Examiner
UNITED STATES PATENTS 2,734,160  2/56  Franks _____ 318—332 X
2,998,547  8/61  Berman _____ 323—22

ORIS L. RADER, *Primary Examiner.*